United States Patent
Nawata et al.

(10) Patent No.: US 9,851,474 B2
(45) Date of Patent: Dec. 26, 2017

(54) OPTICAL COMPONENT AND METHOD OF PRODUCING THE SAME

(71) Applicant: SCIVAX CORPORATION, Kanagawa (JP)

(72) Inventors: Akifumi Nawata, Kanagawa (JP); Satoru Tanaka, Kanagawa (JP)

(73) Assignee: SCIVAX CORPORATION, Kanagawa (JP)

( * ) Notice: Subject to any disclaimer, the term of this patent is extended or adjusted under 35 U.S.C. 154(b) by 0 days.

(21) Appl. No.: 14/889,914

(22) PCT Filed: Jul. 9, 2015

(86) PCT No.: PCT/JP2015/069750
§ 371 (c)(1),
(2) Date: Nov. 9, 2015

(87) PCT Pub. No.: WO2016/006651
PCT Pub. Date: Jan. 14, 2016

(65) Prior Publication Data
US 2017/0108623 A1    Apr. 20, 2017

(30) Foreign Application Priority Data

Jul. 10, 2014  (JP) ................................. 2014-141958

(51) Int. Cl.
| | | |
|---|---|---|
| G02B 1/11 | (2015.01) | |
| G02B 1/118 | (2015.01) | |
| G02B 1/111 | (2015.01) | |
| G02B 1/115 | (2015.01) | |
| G02B 1/113 | (2015.01) | |

(52) U.S. Cl.
CPC ............. *G02B 1/118* (2013.01); *G02B 1/11* (2013.01); *G02B 1/111* (2013.01); *G02B 1/113* (2013.01); *G02B 1/115* (2013.01)

(58) Field of Classification Search
CPC ........... G02B 1/118; G02B 1/115; G02B 1/11; G02B 1/111; G02B 1/113
USPC ........................................ 359/601, 580, 586
See application file for complete search history.

(56) References Cited

U.S. PATENT DOCUMENTS

| | | | | |
|---|---|---|---|---|
| 9,126,860 | B2 * | 9/2015 | Kakegawa | .............. C03C 1/008 |
| 2002/0135869 | A1 * | 9/2002 | Banish | ..................... G02B 1/11 359/350 |
| 2004/0091642 | A1 * | 5/2004 | Murakami | ........... G02B 5/0215 428/1.31 |
| 2007/0211346 | A1 * | 9/2007 | Noguchi | ................ G02B 1/118 359/603 |
| 2008/0107868 | A1 * | 5/2008 | Kuroda | .................. G02B 1/118 428/141 |

(Continued)

FOREIGN PATENT DOCUMENTS

| | | |
|---|---|---|
| JP | 2010-78803 A | 4/2010 |
| JP | 2014-109635 A | 6/2014 |

*Primary Examiner* — William R Alexander
(74) *Attorney, Agent, or Firm* — Schroeder Intellectual Property Law Group, LLC

(57) ABSTRACT

An optical component capable of sufficiently reducing reflection of light by controlling a change in refractive index, even if incident angle of light varies. An optical component includes a base, a moth-eye structure with predetermined concavities and convexities, and at least one buffer layer provided between the base and the moth-eye structure. A change in refractive index between the base and a medium is adjusted by the buffer layer and the moth-eye structure.

6 Claims, 14 Drawing Sheets

(56) References Cited

U.S. PATENT DOCUMENTS

| | | | | |
|---|---|---|---|---|
| 2009/0061150 A1* | 3/2009 | Noguchi | G02B 1/118 | 428/119 |
| 2011/0051249 A1* | 3/2011 | Endoh | G02B 1/118 | 359/599 |
| 2011/0242662 A1* | 10/2011 | Momoki | G02B 1/118 | 359/586 |
| 2012/0026591 A1* | 2/2012 | Hayashibe | B82Y 20/00 | 359/601 |
| 2012/0229906 A1* | 9/2012 | Miyahara | B82Y 20/00 | 359/601 |
| 2012/0314294 A1* | 12/2012 | Nakayama | C08G 73/10 | 359/580 |
| 2013/0271842 A1* | 10/2013 | Miyahara | G02B 1/11 | 359/601 |
| 2014/0071552 A1* | 3/2014 | Uchiyama | G02B 1/115 | 359/885 |
| 2014/0085729 A1* | 3/2014 | Uchiyama | G02B 1/118 | 359/614 |
| 2015/0048380 A1* | 2/2015 | Koike | H01L 33/22 | 257/76 |
| 2015/0085369 A1* | 3/2015 | Tazawa | G02B 1/118 | 359/601 |
| 2015/0103396 A1* | 4/2015 | Zollars | G02B 1/12 | 359/350 |
| 2015/0116834 A1* | 4/2015 | Osumi | G02B 1/118 | 359/601 |
| 2015/0144185 A1* | 5/2015 | Onomoto | B32B 7/02 | 136/256 |
| 2015/0167921 A1* | 6/2015 | Gollier | F21V 5/002 | 362/326 |
| 2015/0219799 A1* | 8/2015 | Sonoda | G02B 1/116 | 359/513 |
| 2015/0316691 A1* | 11/2015 | Nakayama | C09D 133/24 | 428/148 |

\* cited by examiner

OPTICAL COMPONENT AND METHOD OF PRODUCING THE SAME

RELATED APPLICATIONS

The present application is a national phase application of International Patent Application No. PCT/JP2015/069750, filed Jul. 9, 2015, which claims the filing benefit of Japanese Patent Application No. 2014-141958, filed Jul. 10, 2014, the contents of both of which are incorporated herein by reference.

TECHNICAL FIELD

The present disclosure relates to an optical component that reduces reflection of light from a surface, and a method of producing the same.

BACKGROUND ART

In the case of transmissive optical components, such as light transmissive lenses and displays, solar light, illumination light, etc., are reflected from an interface that is in contact with air. This sometimes decreases a visibility. Hence, according to conventional technologies, a coating is applied to a surface of an optical component, and a moth-eye structure is provided on the surface in order to reduce reflection of light (see, for example, Patent Document 1).

CITATION LIST

Patent Literature

Patent Document 1: JP 2014-51601 A

SUMMARY OF INVENTION

Technical Problem

According to the conventional technologies, however, a capability of reducing reflection of light is still insufficient, and a further improvement has been desired. In addition, the conventional technologies are made in consideration of reflection only when the incident angle of light is constant, and a case in which the incident angle of light varies is out of consideration. When, for example, the incident angle of light is substantially 0 degree (vertical), reflection of light can be reduced, but it becomes more difficult to sufficiently reduce reflection as the incident angle increases more. Therefore, when the optical component has a curvature like a lens, and the incident angle of light varies, sufficient reduction of the reflection of light is not accomplished.

Therefore, it is an objective of the present disclosure to provide an optical component that is capable of further reducing reflection of light, and a method of producing the same. In addition, it is another objective to provide an optical component that is capable of sufficiently reducing reflection of light although the incident angle of light varies, and a method of producing the same.

Solution to Problem

In order to accomplish the above objectives, an optical component according to the present disclosure includes:
a base;
a moth-eye structure including predetermined concavities and convexities; and
at least one buffer layer provided between the base and the moth-eye structure, and the buffer layer is formed of a material that has a refractive index lower than a refractive index of the base, but higher than a refractive index of the moth-eye structure.

In this case, it is preferable that, when a position of an interface of the moth-eye structure at the base side is 0, a shortest distance from the interface toward the moth-eye structure is t, a refractive index of the closest buffer layer to the moth-eye structure is $n_B$, an average refractive index of the moth-eye structure at a location with the distance t from the interface is $n_t$, a shortest distance from the interface to a vertex of the convexity of the moth-eye structure is h, and a refractive index of a medium in contact with a surface of the moth-eye structure is $n_M$, the average refractive index of the moth-eye structure should be adjusted in such a way that the refractive index $n_t$ satisfies a following formula (1):

$$-0.15 \times (n_B - n_M) + n_M + \frac{(n_B - n_M)(t-h)^2}{h^2} \leq \quad \text{Formula (1)}$$

$$n_t \leq 0.15 \times (n_B - n_M) + n_M + \frac{(n_B - n_M)(t-h)^2}{h^2}.$$

In addition, it is preferable that, when a position of an interface between the base and the buffer layer is 0, a shortest distance from the interface toward the moth-eye structure is t, a refractive index of the base is $n_s$, a refractive index of the buffer layer or an average refractive index of the moth-eye structure at a location with the distance t from the interface is $n_t$, a shortest distance from the interface to a vertex of the convexity of the moth-eye structure is h, and a refractive index of a medium in contact with a surface of the moth-eye structure is $n_M$, the refractive index of the buffer layer and the average refractive index of the moth-eye structure should be adjusted in such a way that the refractive index $n_t$ satisfies a following formula (2):

$$-0.15 \times (n_S - n_M) + n_M + \frac{(n_S - n_M)(t-h)^2}{h^2} \leq \quad \text{Formula (2)}$$

$$n_t \leq 0.15 \times (n_S - n_M) + n_M + \frac{(n_S - n_M)(t-h)^2}{h^2}.$$

It is preferable that the moth-eye structure should be in a cone shape or is in a conical trapezoid shape.

According to another aspect of the present disclosure, a method of producing an optical component that includes a base, a moth-eye structure with predetermined concavities and convexities, and at least one buffer layer provided between the base and the moth-eye structure, and the method includes:
applying as a material of the buffer layer, a material that has a refractive index lower than a refractive index of the base, but higher than a refractive index of the moth-eye structure.

In this case, it is preferable that, when a position of an interface of the moth-eye structure at the base side is 0, a shortest distance from the interface toward the moth-eye structure is t, a refractive index of the closest buffer layer to the moth-eye structure is $n_B$, an average refractive index of the moth-eye structure at a location with the distance t from the interface is $n_t$, a shortest distance from the interface to a vertex of the convexity of the moth-eye structure is h, and a refractive index of a medium in contact with a surface of the moth-eye structure is $n_M$, the refractive index of the buffer layer and the average refractive index of the moth-eye structure should be adjusted in such a way that the refractive index $n_t$ satisfies a following formula (1):

$$-0.15 \times (n_B - n_M) + n_M + \frac{(n_B - n_M)(t-h)^2}{h^2} \leq$$

$$n_t \leq 0.15 \times (n_B - n_M) + n_M + \frac{(n_B - n_M)(t-h)^2}{h^2}. \quad \text{Formula (1)}$$

In addition, it is preferable that, when a position of an interface between the base and the buffer layer is 0, a shortest distance from the interface toward the moth-eye structure is t, a refractive index of the base is $n_S$, a refractive index of the buffer layer or an average refractive index of the moth-eye structure at a location with the distance t from the interface is $n_t$, a shortest distance from the interface to a vertex of the convexity of the moth-eye structure is h, and a refractive index of a medium in contact with a surface of the moth-eye structure is $n_M$, the refractive index of the buffer layer and the average refractive index of the moth-eye structure should be adjusted in such a way that the refractive index $n_t$ satisfies a following formula (2):

$$-0.15 \times (n_S - n_M) - n_M + \frac{(n_S - n_M)(t-h)^2}{h^2} \leq$$

$$n_t \leq 0.15 \times (n_S - n_M) + n_M + \frac{(n_S - n_M)(t-h)^2}{h^2}. \quad \text{Formula (2)}$$

Still further, it is preferable that the moth-eye structure should be formed in a cone shape or is in a conical trapezoid shape.

Advantageous Effects of Invention

According to the present disclosure, there is provided an optical component that is capable of sufficiently reducing reflection of light by controlling a change in refractive index although the incident angle of light varies.

It is to be understood that the aspects and objects of the present invention described above may be combinable and that other advantages and aspects of the present invention will become apparent upon reading the following description of the drawings and detailed description of the invention. dr

Figure 1:
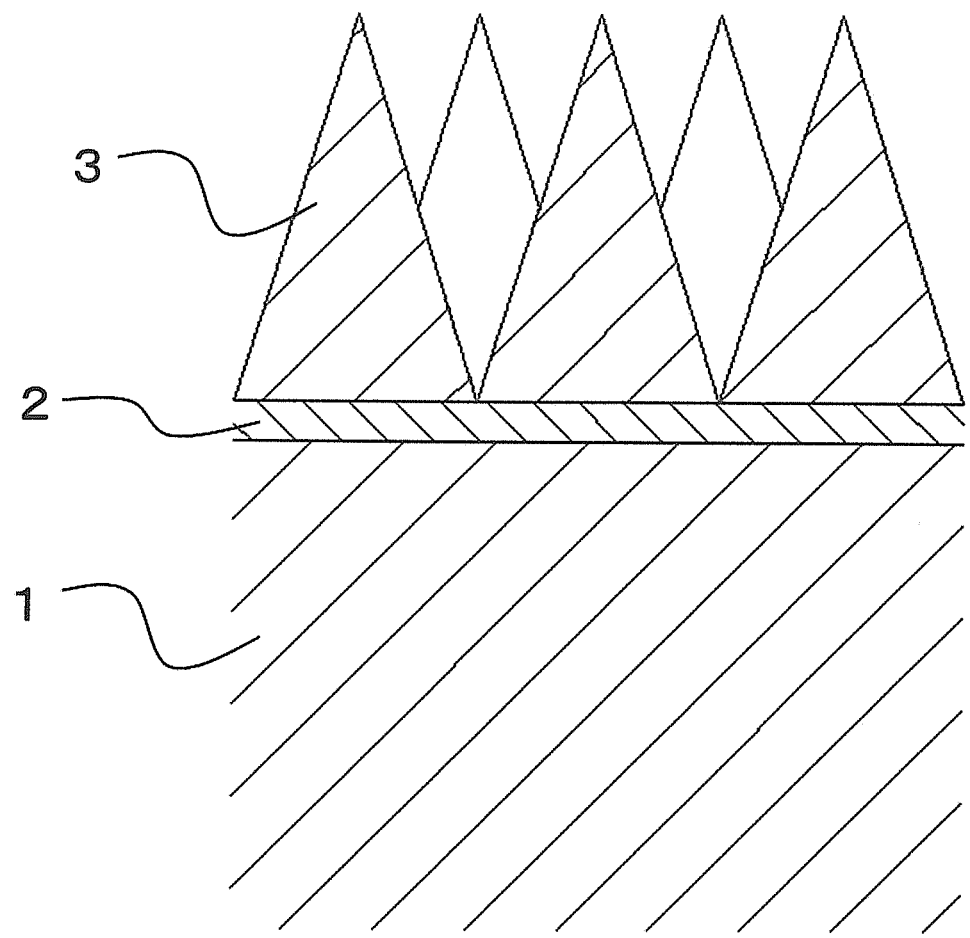
FIG. 1 is a side cross-sectional view illustrating an optical component according to the present disclosure.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

DESCRIPTION OF EMBODIMENTS

An optical component according to the present disclosure includes a base 1, a moth-eye structure 3 with predetermined concavities and convexities, and at least one buffer layer 2 provided between the base 1 and the moth-eye structure 3. A change in refractive index between the base 1 and a medium is adjusted by the buffer layer 2 and the moth-eye structure 3.

In this case, the term optical component means a component that has a light-transmissive surface, such as a lens, a prism, a filter, a mirror, or a display.

The base 1 has a predetermined function as an optical component element. The shape of the base is not limited to any particular one, and can be freely designed according to the function of the optical component and the application thereof, such as a plate shape like a display, and a curved shape like a lens. The material is also freely selectable according to the function of the optical component and the application thereof, but an optically transparent material within a visible light range between 400 nm and 780 nm is preferable since such a material is applicable to various optical applications. When the optical component is utilized within an ultraviolet light range, a material that contains silica glass and sapphire glass which have high ultraviolet light transmissivity is preferable.

The term medium means a substance and a physical body that becomes a light propagation field, and is a gas like air that is in contact with the surface of the optical component (the surface of the moth-eye structure 3) and a liquid like water, but may be a vacuum.

The moth-eye structure 3 is a microscopic concavo-convex structure similar to the shape of "an eye of a moth". Light is likely to be reflected at a part where a change in refractive index is large. Conversely, it is known that, when the concavo-convex structure of the moth-eye structure 3 is formed at a smaller cycle than the wavelength of a visible light range, light behaves as if an average refractive index obtained by averaging the refractive index of the medium at an arbitrary location in the vertical direction of the concavo-convex structure, and, the refractive index of the material applied to the moth-eye structure 3 is the refractive index at this location. Hence, when the concavo-convex structure of the moth-eye structure 3 is formed so as to change the average refractive index gradually, a sharp change in refractive index is eliminated, and thus reflection of incident light can be reduced. Example concavo-convex structures applicable are cone shapes like a circular cone, conical trapezoids like a three-dimensional shape obtained by eliminating, from a cone, a cone with a common vertex to that of the former cone but scaled down similarly, and bombshell-like shapes having a side face expanded in the horizontal direction. Needless to say, the present disclosure is not limited to those shapes. As for how to produce the moth-eye structure, conventionally well-known arbitrary methods are applicable, such as nano-imprinting, injection molding, and photolithography.

In this case, the more the change in refractive index is gentle, the more the moth-eye structure 3 reduces reflection of light from the surface. Hence, when the respective refractive indexes of materials applied to the moth-eye structure 3 are the same, the longer the distance between the surface of the base 1 and the vertex of the convexity of the moth-eye structure 3 is, the more the reflection of light is reduced. However, by elongating such a distance only by the moth-eye structure 3, accomplishment of such a structure is not easy due to technical constraints in processes. Hence, according to the optical component of the present disclosure, as illustrated in FIG. 1, at least one buffer layer 2 that is formed of a material with a refractive index lower than that of the base 1 but higher than that of the moth-eye structure 3 is formed between the base 1 and the moth-eye structure 3. In addition, when equal to or greater than two buffer layers 2 are to be formed, the buffer layers 2 are arranged in such a way that the refractive index of the buffer layer 2 at the base-1 side is higher than that of the buffer layer 2 at the moth-eye-structure-3 side. The reason why such a structure is employed is to enable an application of a material that has a low refractive index to the moth-eye structure 3, thereby reducing a change in refractive index. The materials of the buffer layers 2 and moth-eye structure 3 are freely selectable, but for example, a material that has a refractive index adjusted by a siloxane-based material is applicable.

As for how to form the buffer layer 2 on the base 1, any methods are applicable as long as the base 1 and the buffer layer 2 are in contact with each other intimately and uniformly, and for example, a thermosetting material with an adjusted refractive index may be applied by spin coating, and the such a material may be heated to form the buffer layer on the base.

Figure 2:
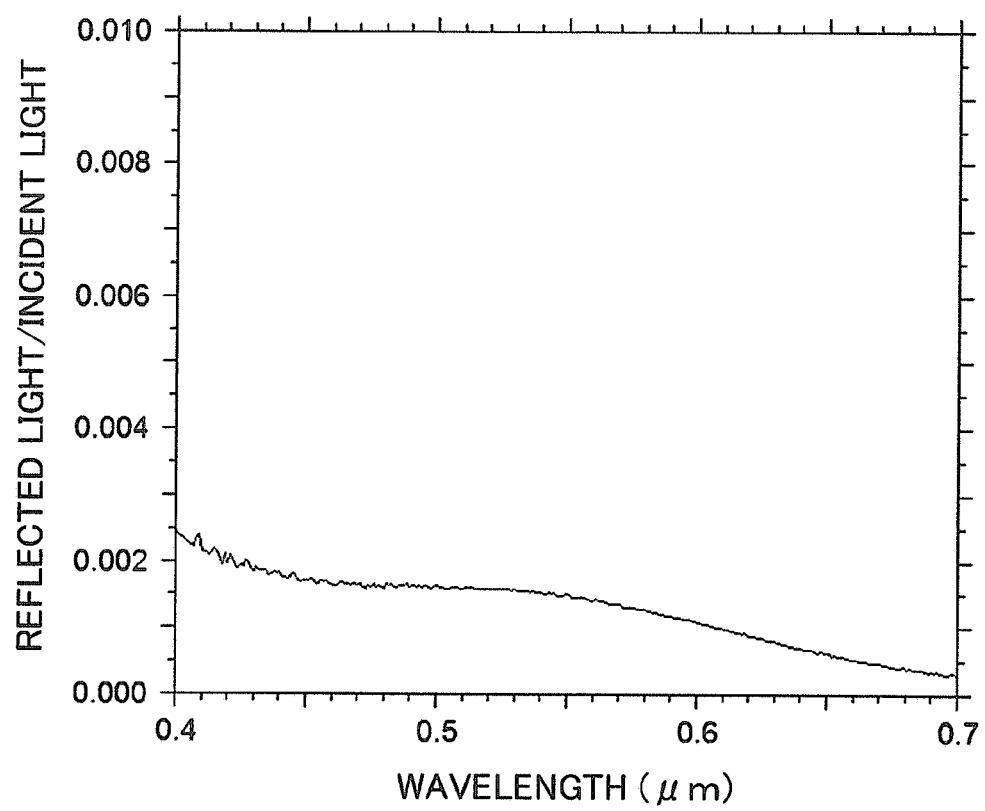
FIG. 2 is a diagram illustrating optical characteristics of the optical component according to the present disclosure.
Figure 3:
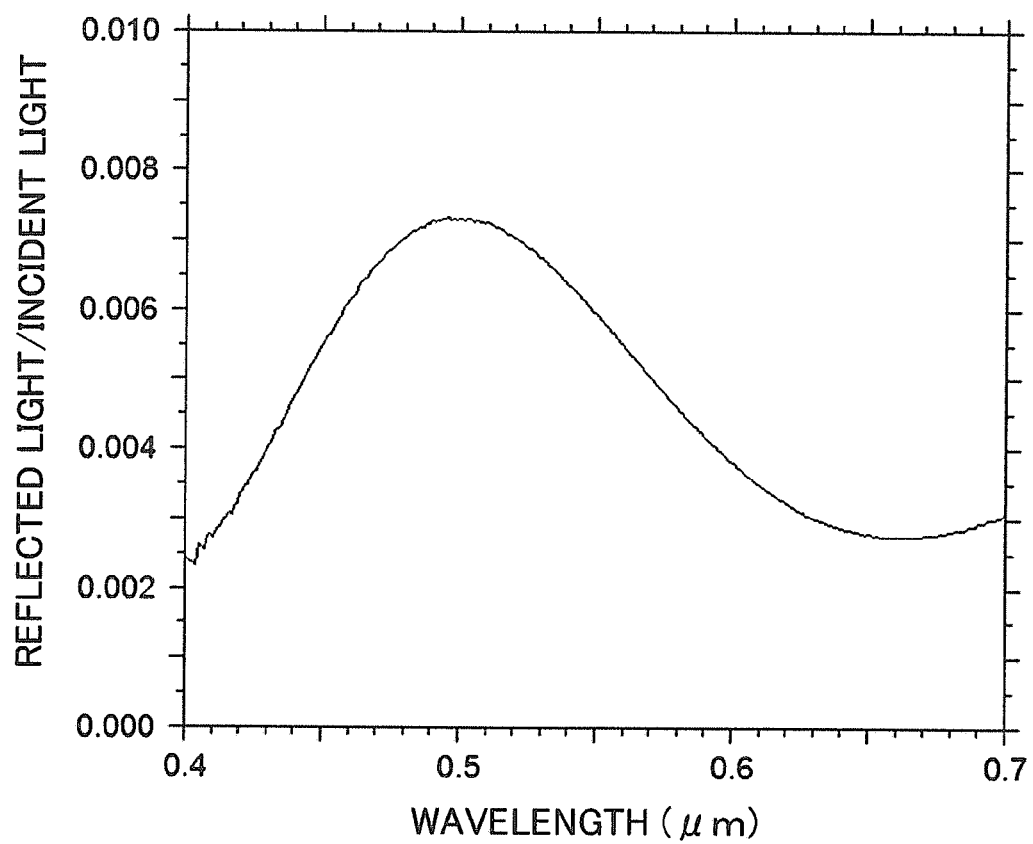
FIG. 3 is a diagram illustrating optical characteristics of a conventional optical component.

FIGS. 2 and 3 illustrate optical characteristics when the buffer layer 2 is present or is absent between the base 1 and the moth-eye structure 3. As for the optical characteristics, a relationship between a wavelength of light and a ratio of an intensity of reflected light relative to incident light (reflected light/incident light) was measured. As for light, light was emitted to the optical component at an incident angle of 0 degree (perpendicular to the optical component), and the relationship between the intensity of reflected light and the wavelength in the direction in which the incident angle was 0 degree was measured. As for the wavelength, measurements were made within a range between 400 nm and 700 nm that is a visible light range.

Figure 4:
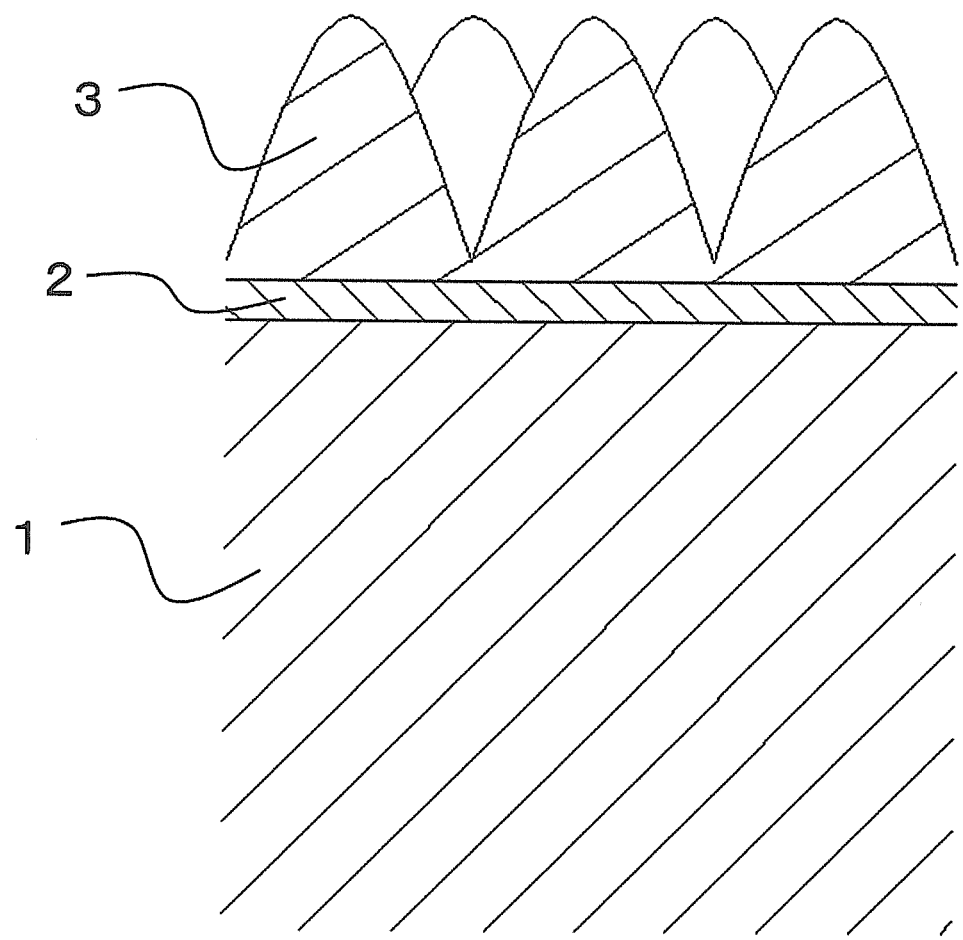
FIG. 4 is a side cross-sectional view illustrating an optical component according to the present disclosure.
Figure 5:
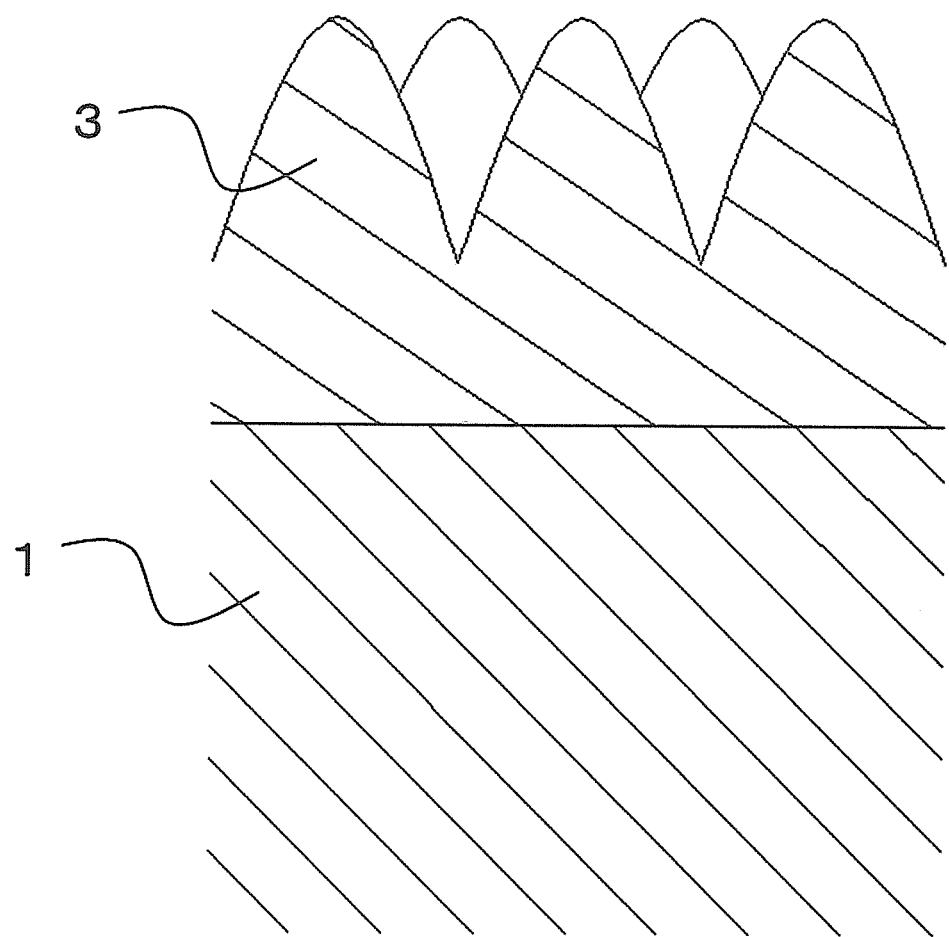
FIG. 5 is a side cross-sectional view illustrating a conventional optical component.

As for the optical component, as illustrated in FIG. 4, an optical component (first example) that included the base 1 formed of a glass (PCD51) with a refractive index of 1.59, the buffer layer 2 formed of a siloxane-based material with a refractive index of 1.52, and the moth-eye structure 3 formed of a siloxane-based material with a refractive index of 1.47, and, as illustrated in FIG. 5, an optical component (first comparative example) that included the base 1 formed of a glass with a refractive index of 1.59, and the moth-eye structure 3 formed of a siloxane-based material with a refractive index of 1.47 were applied. In this case, as for the applied moth-eye structure 3, bomb-shell like concavities and convexities with a height of 220 nm, and a bottom diameter of 250 nm were arranged in a triangular shape at a pitch of 250 nm. The moth-eye structure was produced by nano-imprinting. In addition, the remaining thickness of the moth-eye structure 3 between the moth-eye structure 3 and the buffer layer 2 in the first example was 20 nm, and the thickness of the buffer layer 2 was 35 nm, while the remaining thickness of the moth-eye structure 3 between the moth-eye structure 3 and the base 1 in the first comparative example was 160 nm. The test was carried out under an atmospheric condition. That is, the medium was air that has a refractive index of 1.000.

As illustrated in FIGS. 2 and 3, it becomes clear that the optical component according to the first example provided with the buffer layer 2 further reduced reflection of light in comparison with the optical component according to the first comparative example which had no buffer layer 2.

In addition, the inventors of the present disclosure further keenly examined, and consequently found that, as for the moth-eye structure 3, when the position of the interface of the moth-eye structure 3 at the base-1 side is 0, the shortest distance from the interface toward the moth-eye structure 3 is t, the refractive index of the base 1 is $n_s$, the average refractive index of the moth-eye structure 3 at a location with the distance t from the interface is $n_t$, the shortest distance from the interface to the vertex of the convexity of the moth-eye structure 3 is h, and the refractive index of the medium in contact with the surface of the moth-eye structure 3 is $n_M$, the closer the refractive index $n_t$ is to the following formula (A), the higher the effect of reducing reflection of light from a broad range of angles becomes.

$$n_t = n_M + \frac{(n_S - n_M)(t - h)^2}{h^2} \quad \text{Formula (A)}$$

Still further, the inventors of the present disclosure also found that, when the refractive index $n_t$ is an error which is equal to or smaller than 15% of a difference $(n_s - n_M)$ between the refractive index $n_s$ of the base 1 and the refractive index $n_M$ of the medium, an effect of reducing reflection of light incident from wider angles is sufficiently high in comparison with conventional technologies. When this is expressed as a formula, the following formula (B) is obtained.

$$-0.15 \times (n_S - n_M) + n_M + \frac{(n_S - n_M)(t-h)^2}{h^2} \leq$$
$$n_t \leq 0.15 \times (n_S - n_M) + n_M + \frac{(n_S - n_M)(t-h)^2}{h^2} \quad \text{Formula (B)}$$

Figure 6:
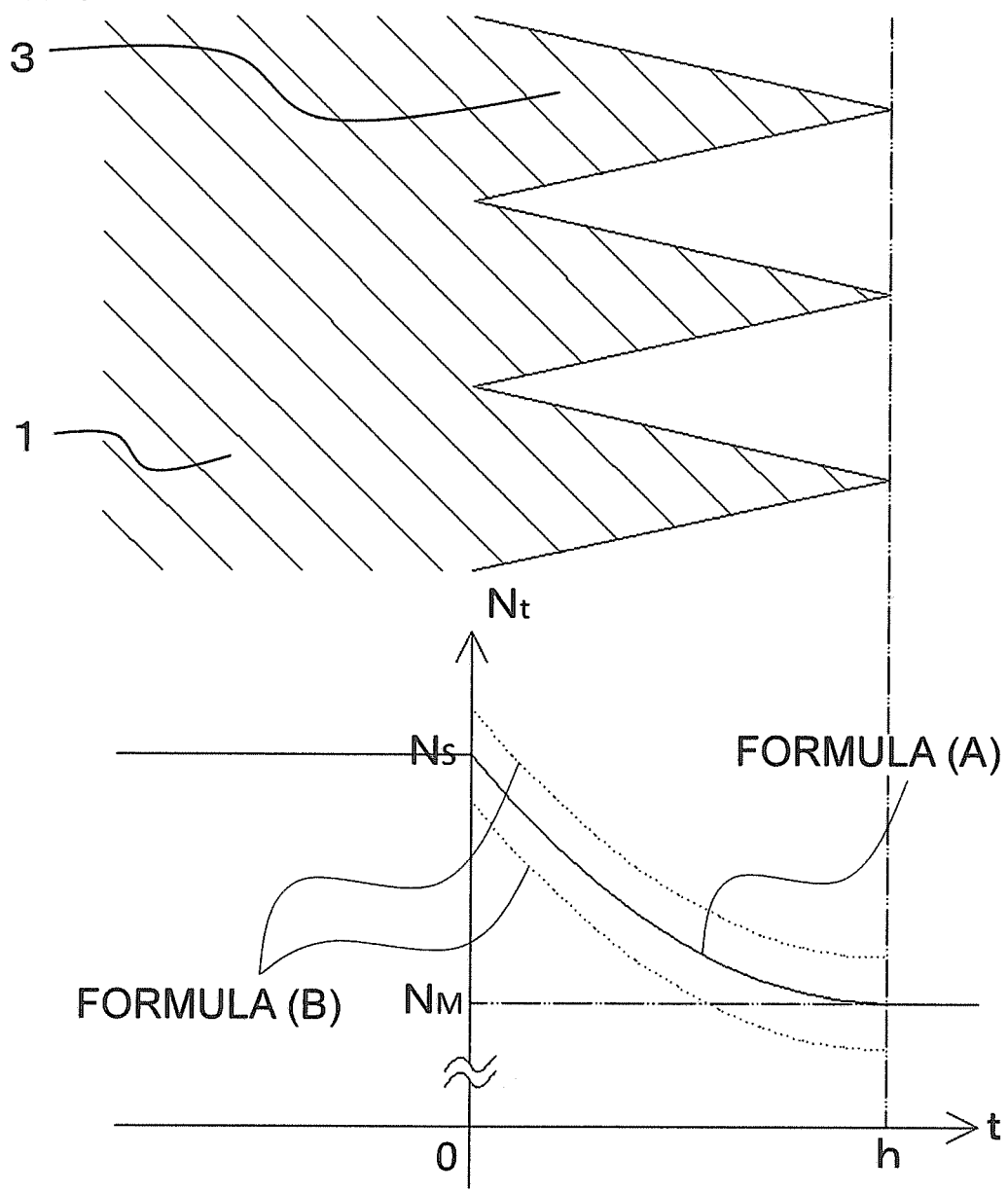
FIG. 6 is a diagram to explain a formula (A) and a formula (B)

Note that, in the moth-eye structure 3, the concavo-convex structure that satisfies the formula (A) is cones like circular cones. FIG. 6 illustrates a relationship between the formulae (A), (B) and the moth-eye structure 3 that satisfies the formula (A).

Figure 7:
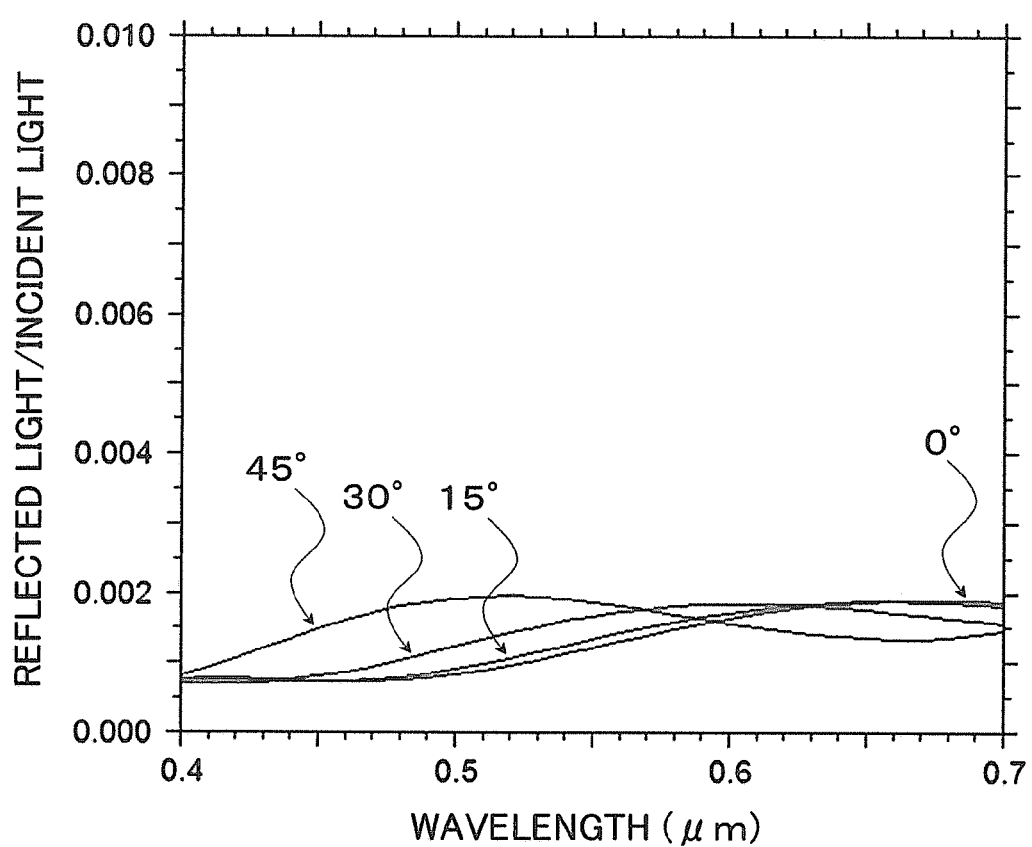
FIG. 7 is a diagram illustrating optical characteristics of an optical component that satisfies the formula (B)
Figure 8:
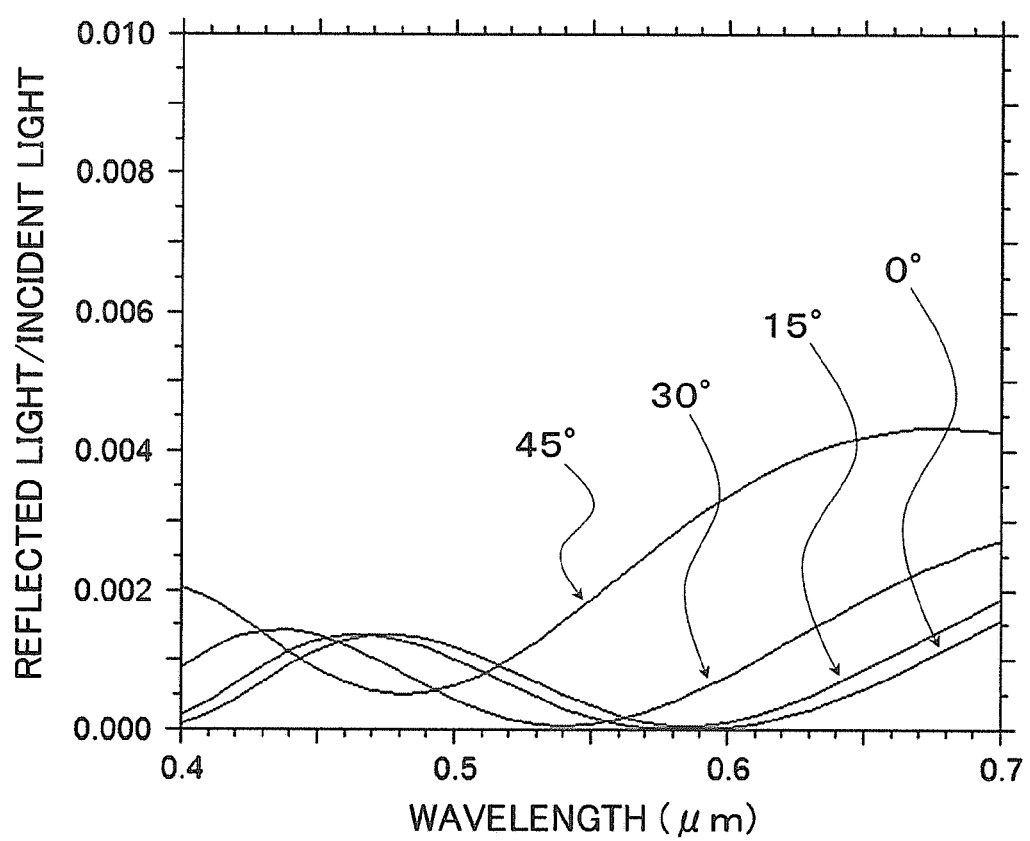
FIG. 8 is a diagram illustrating optical characteristics of an optical component that does not satisfy the formula (B)

FIG. 7 shows a simulation result of optical characteristics of an optical component (second example) that satisfies the formula (B), and FIG. 8 shows a simulation result of optical characteristics of an optical component (second comparative example) that does not satisfy the formula (B). As for the optical characteristics, a relationship between a wavelength of light and a ratio (reflected light/incident light) of the intensity of reflected light relative to incident light was calculated. As for light, light was emitted to the optical component at an incident angle of 0, 15, 30, or 45 degrees, and a relationship between the intensity of reflected light and the wavelength in the direction in which the incident angle was 0 degree was calculated. As for the wavelength, the calculation was made within a range between 400 nm to 700 nm that was a visible light range. Note that for a simulation, a software "DiffractMOD" released by Synopsys, Inc., was applied.

Figure 9:
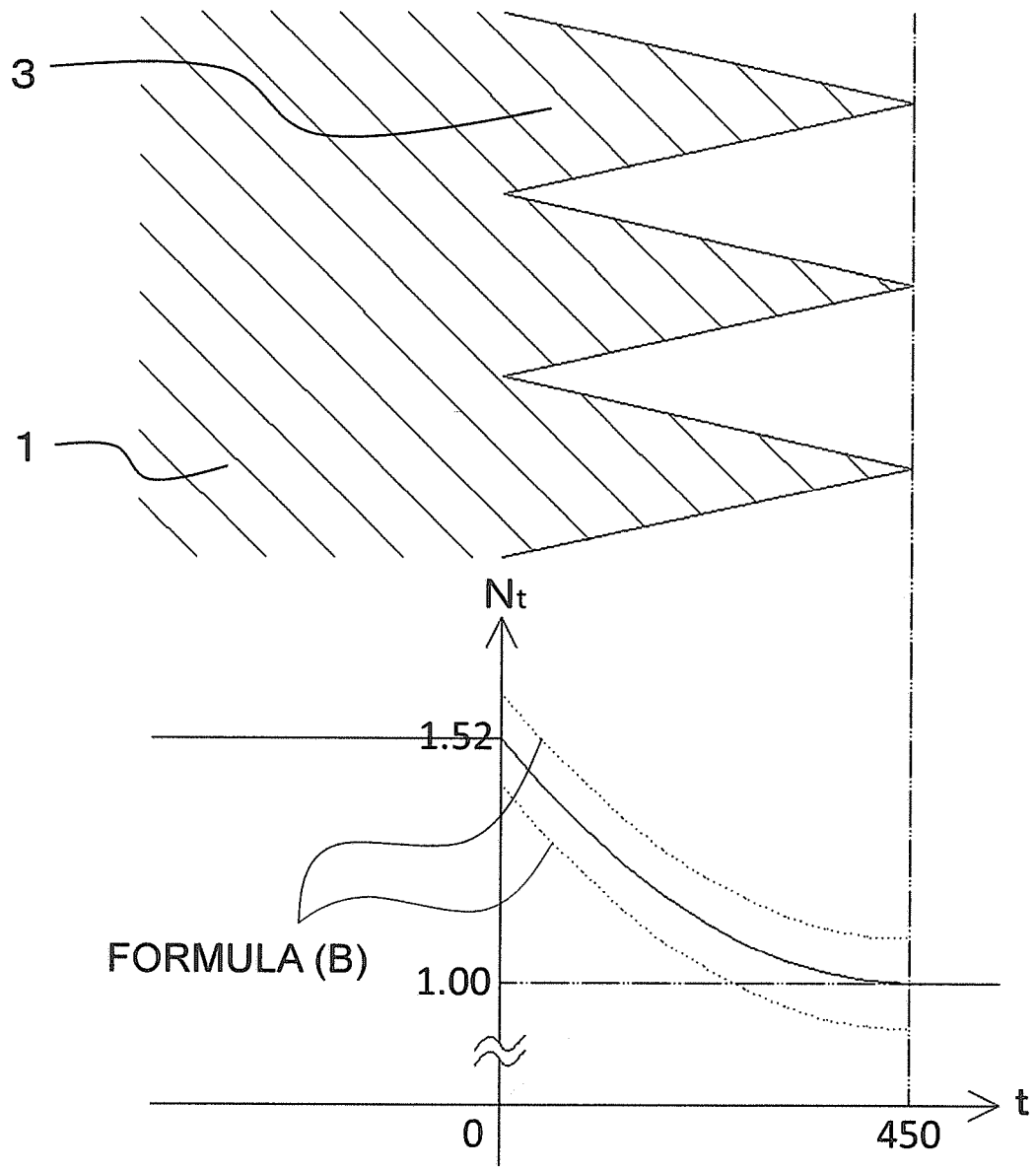
FIG. 9 is a diagram to explain an optical component that satisfies the formula (B)
Figure 10:
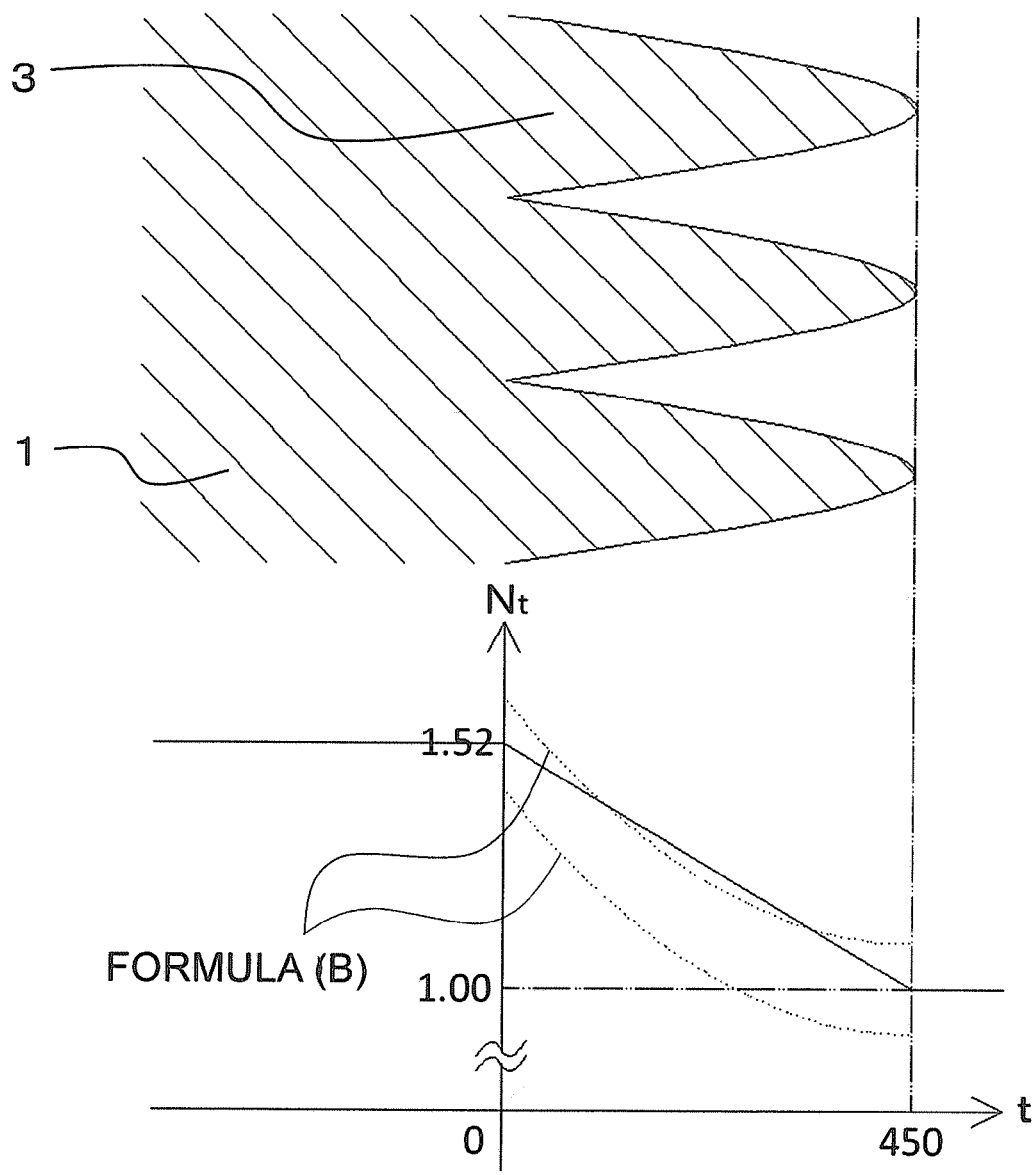
FIG. 10 is a diagram to explain an optical component that does not satisfy the formula (B)

In addition, as for the simulation, the optical that included the base 1 and the moth-eye structure 3 both of which are formed of amaterial with a refractive index of 1.52 was applied. Still further, as for the moth-eye structure 3 of the optical component, circular cone concavities and convexities which had a height of 450 nm, and a diameter of 200 nm were arranged in a triangular shape at a pitch of 200 nm (see FIG. 9) and bombshell-like concavities and convexities which had a height of 450 nm, and a diameter of 200 nm were arranged in a triangular shape at a pitch of 200 nm (see FIG. 10) so as to change the average refractive index linearly were applied. Note that the medium present on the surface of the optical component was air that has a refractive index of 1.00.

Based on a comparison of results shown in FIG. 7 and in FIG. 8, it becomes clear that the optical component according to the second example further sufficiently reduced reflection of light although the incident angle of light changed.

Hence, according to the optical component of the present disclosure, in consideration of the buffer layer 2 present between the base 1 and the moth-eye structure 3, when the position of the interface (bottom of concavities and convexities) of the moth-eye structure 3 at the base-1 side is 0, the shortest distance from the interface toward the moth-eye structure 3 is t, the refractive index of the closest buffer layer 2 to the moth-eye structure 3 is $n_B$, an average refractive index of the moth-eye structure 3 at a location with the distance t from the interface is $n_t$, the shortest distance from the interface to the vertex of the convexity of the moth-eye structure 3 is h, and the refractive index of the medium in contact with the surface of the moth-eye structure 3 is $n_M$, it is preferable that the average refractive index of the moth-eye structure 3 should be adjusted in such a way that the refractive index $n_t$ satisfies the following formula (1).

$$-0.15 \times (n_B - n_M) + n_M + \frac{(n_B - n_M)(t-h)^2}{h^2} \leq$$ Formula (1)

$$n_t \leq 0.15 \times (n_B - n_M) + n_M + \frac{(n_B - n_M)(t-h)^2}{h^2}$$

Note that, as long as the formula (1) is satisfied, the concavities and convexities of the moth-eye structure may be in an arbitrary shape, such as cones other than a circular cone, a conical trapezoid, or a bombshell-like shape. In addition, it is preferable that the error should be smaller, such as equal to or smaller than 10%, equal to or smaller than 8%, equal to or smaller than 5%, equal to or smaller than 3%, equal to or smaller than 2%, and equal to or smaller than 1%.

In addition, in the formula (1), only the height of the moth-eye structure 3 is taken into consideration, but more preferably, the thickness of the buffer layer 2 and the refractive index thereof should be also taken into consideration. That is, when the position of the interface between the base 1 and the buffer layer 2 is 0, the shortest distance from the interface toward the moth-eye structure is t, the refractive index of the base 1 is $n_S$, the refractive index of the buffer layer 2 or the average refractive index of the moth-eye structure 3 at a location with the distance t from the interface is $n_t$, the shortest distance from the interface to the vertex of the convexity of the moth-eye structure 3 is h, and the refractive index of the medium in contact with the surface of the moth-eye structure 3 is $n_M$, it is more preferable that the refractive index of the buffer layer 2 and the average refractive index of the moth-eye structure 3 should be adjusted in such a way that the refractive index $n_t$ satisfies the following formula (2).

$$-0.15 \times (n_S - n_M) + n_M + \frac{(n_S - n_M)(t-h)^2}{h^2} \leq$$ Formula (2)

$$n_t \leq 0.15 \times (n_S - n_M) + n_M + \frac{(n_S - n_M)(t-h)^2}{h^2}$$

In this case, also, it is preferable that the error should be smaller, such as equal to or smaller than 10%, equal to or smaller than 8%, equal to or smaller than 5%, equal to or smaller than 3%, equal to or smaller than 2%, and equal to or smaller than 1%.

Figure 11:
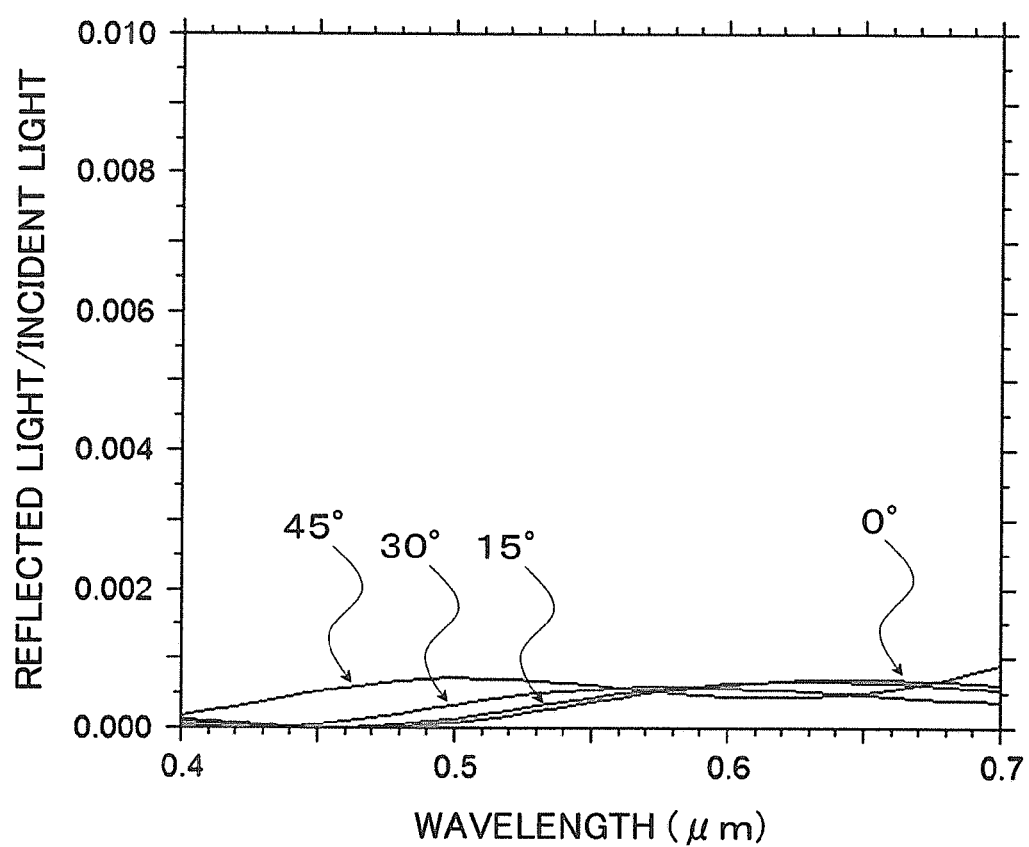
FIG. 11 is a diagram illustrating optical characteristics of an optical component that satisfies a formula (2) according to the present disclosure.
Figure 12:
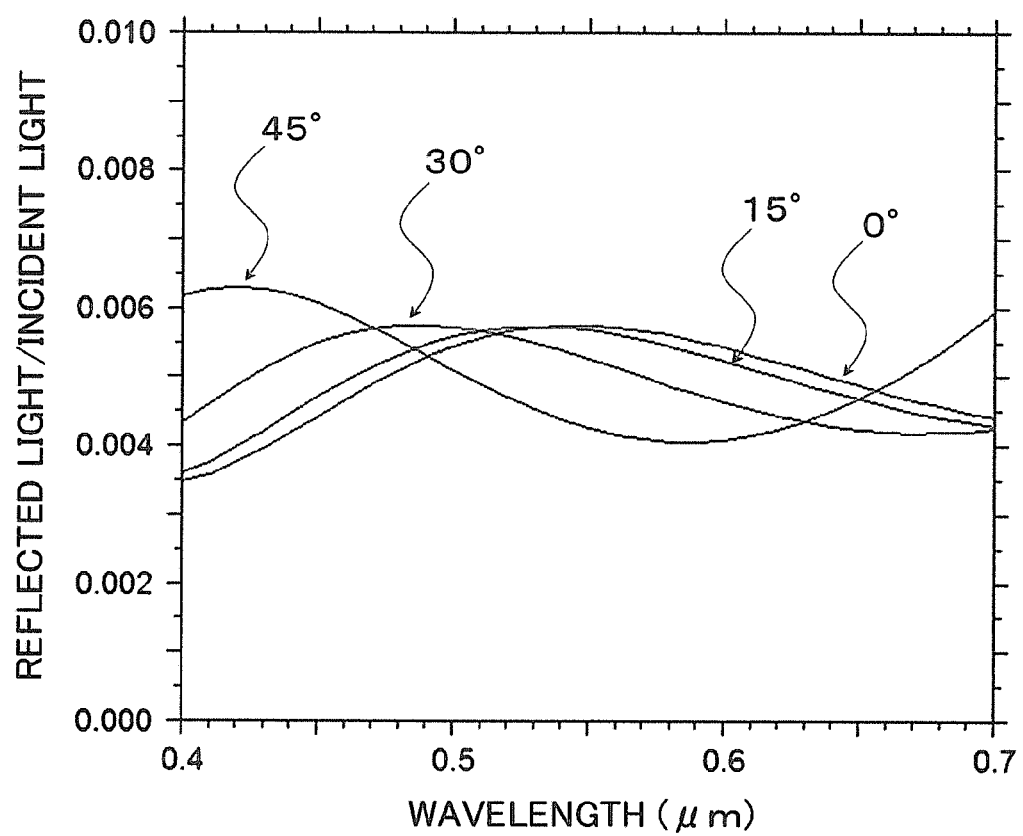
FIG. 12 is a diagram illustrating optical characteristics of an optical component that does not satisfy the formula (2)

FIG. 11 shows a simulation result of optical characteristics of an optical component (third example) that satisfies the formula (2), and FIG. 12 shows a simulation result of optical characteristics of an optical component (second comparative example) that does not satisfy the formula (2). As for the optical characteristics, a relationship between a wavelength of light and a ratio (reflected light/incident light) of the intensity of reflected light relative to incident light was calculated. As for light, light was emitted to the optical component at an incident angle of 0, 15, 30, or 45 degrees, and a relationship between the intensity of reflected light and the wavelength in the direction in which the incident angle was 0 degree was calculated. As for the wavelength, the calculation was made within a range between 400 nm to 700 nm that was a visible light range. Note that for a simulation, a software "DiffractMOD" released by Synopsys, Inc., was applied.

Figure 13:
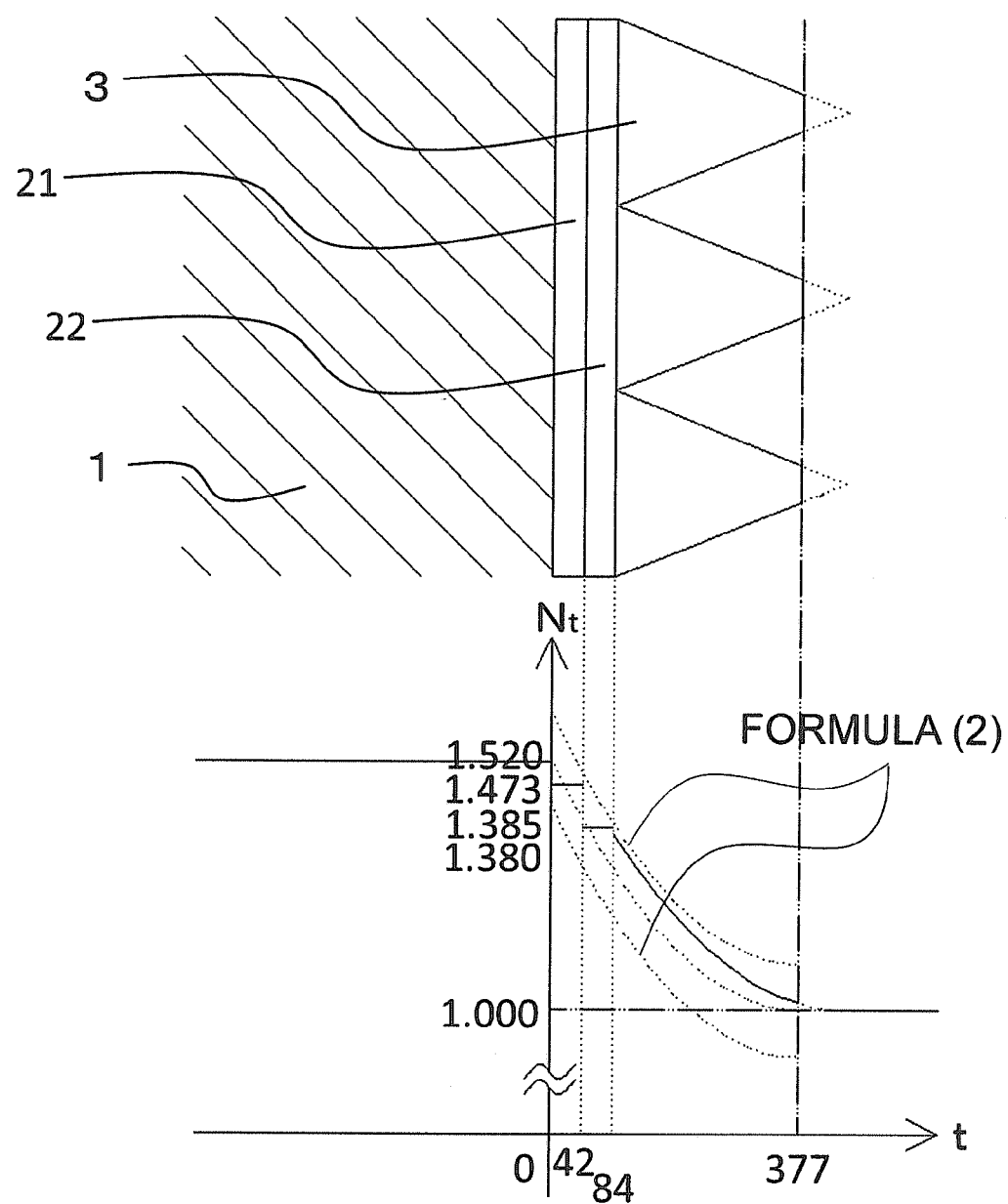
FIG. 13 is a diagram to explain an optical component that satisfies the formula (2) according to the present disclosure.
Figure 14:
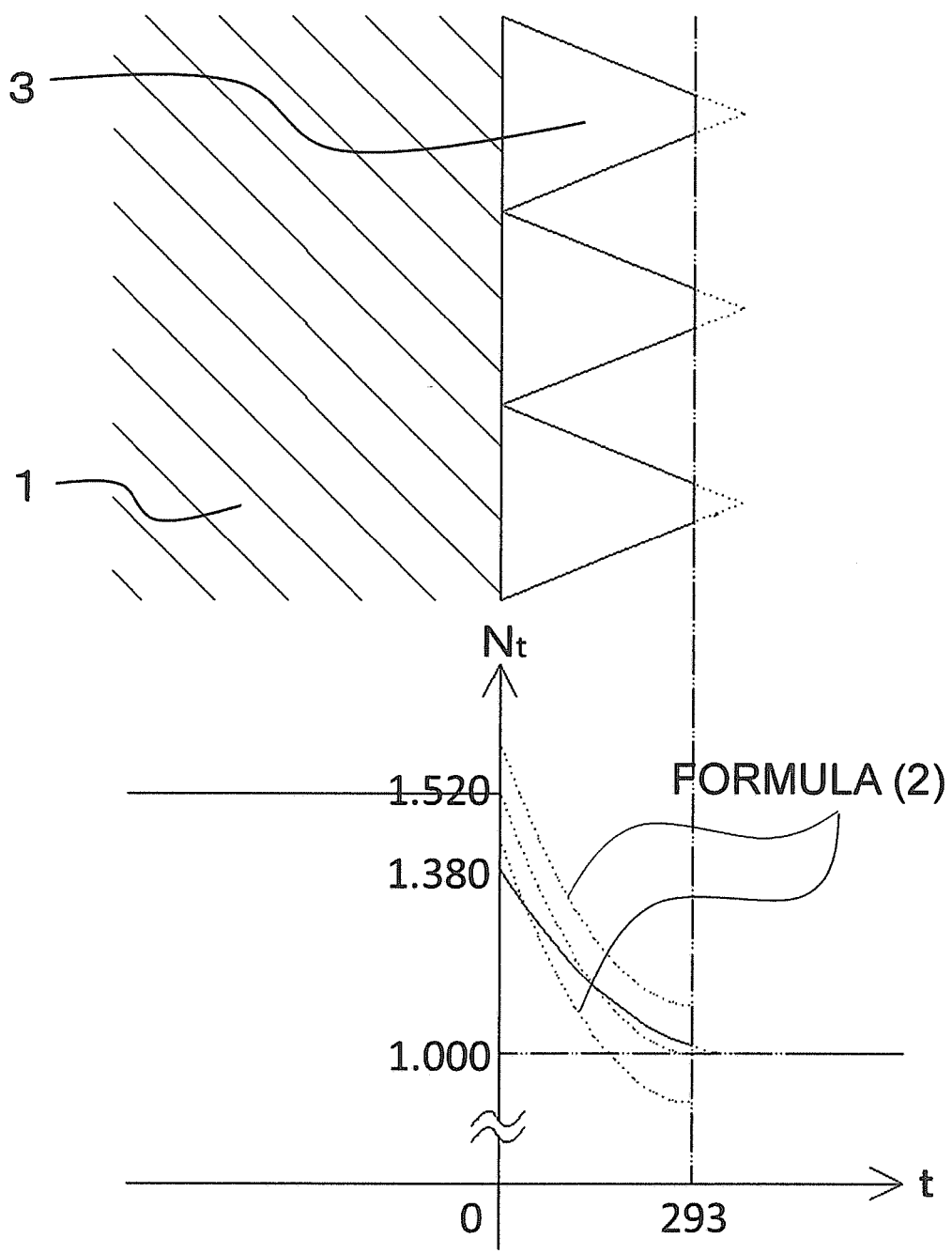
FIG. 14 is a diagram to explain an optical component that does not satisfy the formula (2).

In addition, as for the simulation, as illustrated in FIG. 13, with respect to the optical component, a material for the base 1 that had a refractive index of 1.52, a material for a first buffer layer 21 that had a refractive index of 1.473, a material for the second buffer layer 22 that had a refractive index of 1.385, and a material for the moth-eye structure 3 that had a refractive index of 1.38 were applied (third example). In addition, as illustrated in FIG. 14, without a buffer layer, a material for the base 1 that had a refractive index of 1.52, and a material for the moth-eye structure 3 that had a refractive index of 1.38 were applied (third comparative example). Still further, as for the moth-eye structure 3 of the optical component, both of the third example and the third comparative example included circular cone trapezoids with a height of 293 nm that was obtained by eliminating, from circular cones with a height of 366 nm and a diameter of 200 nm, circular ones with a common vertex but scaled down similarly with a height of 73 nm and a diameter of 40 nm, and such circular cone trapezoids were arranged in a triangular shape at a pitch of 200 nm. Both of the first buffer layer 21 and the second buffer layer 22 had a thickness of 42 nm. Note that the medium present on the surface of the optical component was air that has a reflective index of 1.

Based on a comparison between the result in FIG. 11 and the result in FIG. 12, it becomes clear that the optical component according to the third example further sufficiently reduced reflection of light although the incident angle of light changed.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

REFERENCE SIGNS LIST

1 Base
2 Buffer layer
3 Moth-eye structure
21 First buffer layer
22 Second buffer layer

The invention claimed is:

1. An optical component comprising:
a base;
a moth-eye structure comprising predetermined concavities and convexities; and
at least one buffer layer provided between the base and the moth-eye structure, the buffer layer being formed of a material that has a refractive index lower than a refractive index of the base, but higher than a refractive index of the moth-eye structure,
wherein when a position of an interface between the base and the buffer layer is 0, a shortest distance from the interface toward the moth-eye structure is t, a refractive index of the base is $n_s$, a refractive index of the buffer layer or an average refractive index of the moth-eye structure at a location with the distance t from the interface is $n_t$, a shortest distance from the interface to a vertex of the convexity of the moth-eye structure is h, and a refractive index of a medium in contact with a surface of the moth-eye structure is $n_M$, the refractive index of the buffer layer and the average refractive index of the moth-eye structure are adjusted in such a way that the refractive index $n_t$ satisfies a following formula (2):

$$-0.15 \times (n_S - n_M) - n_M + \frac{(n_S - n_M)(t - h)^2}{h^2} \leq \quad \text{Formula (2)}$$

$$n_t \leq 0.15 \times (n_S - n_M) + n_M + \frac{(n_S - n_M)(t - h)^2}{h^2}.$$

2. The optical component according to claim 1, wherein the moth-eye structure is in a cone shape or is in a conical trapezoid shape.

3. A method for producing an optical component, the method comprising:
providing a base, a moth-eye structure with predetermined concavities and convexities, and at least one buffer layer provided between the base and the moth-eye structure; and
applying as a material of the at least one buffer layer, a material that has a refractive index lower than a refractive index of the base, but higher than a refractive index of the moth-eye structure,
wherein when a position of an interface between the base and the buffer layer is 0, a shortest distance from the interface toward the moth-eye structure is t, a refractive index of the base is $n_s$, a refractive index of the buffer layer or an average refractive index of the moth-eye structure at a location with the distance t from the interface is $n_t$, a shortest distance from the interface to a vertex of the convexity of the moth-eye structure is h, and a refractive index of a medium in contact with a surface of the moth-eye structure is $n_M$, the refractive index of the buffer layer and the average refractive index of the moth-eye structure are adjusted in such a way that the refractive index $n_t$ satisfies a following formula (2):

$$-0.15 \times (n_S - n_M) - n_M + \frac{(n_S - n_M)(t - h)^2}{h^2} \leq \quad \text{Formula (2)}$$

$$n_t \leq 0.15 \times (n_S - n_M) + n_M + \frac{(n_S - n_M)(t - h)^2}{h^2}.$$

4. The method according to claim 3, wherein the moth-eye structure is formed in a cone shape or is in a conical trapezoid shape.

5. The optical component according to claim 1, wherein the moth-eye structure is in a cone shape or is in a conical trapezoid shape.

6. The method according to claim 3, wherein the moth-eye structure is formed in a cone shape or is in a conical trapezoid shape.

* * * * *